United States Patent
Kawakami et al.

(10) Patent No.: US 9,212,094 B2
(45) Date of Patent: Dec. 15, 2015

(54) POLYCARBOXYLIC COPOLYMER, CEMENT DISPERSION AGENT, CEMENT ADMIXTURE, AND CEMENT COMPOSITION

(71) Applicant: NIPPON SHOKUBAI CO., LTD., Osaka-shi, Osaka (JP)

(72) Inventors: Hirokatsu Kawakami, Osaka (JP); Kazutaka Otsuki, Osaka (JP); Akiko Yamauchi, Osaka (JP)

(73) Assignee: NIPPON SHOKUBAI CO., LTD, Osaka (JP)

( * ) Notice: Subject to any disclaimer, the term of this patent is extended or adjusted under 35 U.S.C. 154(b) by 0 days.

(21) Appl. No.: 14/413,381

(22) PCT Filed: Jul. 9, 2013

(86) PCT No.: PCT/JP2013/068697
§ 371 (c)(1),
(2) Date: Jan. 7, 2015

(87) PCT Pub. No.: WO2014/010572
PCT Pub. Date: Jan. 16, 2014

(65) Prior Publication Data
US 2015/0152007 A1    Jun. 4, 2015

(30) Foreign Application Priority Data

Jul. 13, 2012   (JP) .................. 2012-157974

(51) Int. Cl.
| | | |
|---|---|---|
| *C04B 24/04* | (2006.01) | |
| *C04B 24/26* | (2006.01) | |
| *C08F 22/26* | (2006.01) | |
| *C08F 290/06* | (2006.01) | |
| *C08F 222/10* | (2006.01) | |
| *C08F 220/06* | (2006.01) | |
| *C04B 103/40* | (2006.01) | |

(52) U.S. Cl.
CPC ............ *C04B 24/045* (2013.01); *C04B 24/2647* (2013.01); *C08F 22/26* (2013.01); *C08F 220/06* (2013.01); *C08F 290/062* (2013.01); *C04B 2103/408* (2013.01)

(58) Field of Classification Search
CPC ............ C04B 24/045; C04B 2103/408; C08F 222/10; C08F 290/062; C08F 22/26; C08F 220/06
USPC ........ 524/5, 4; 526/320, 321, 322, 323, 328.5
See application file for complete search history.

(56) References Cited

U.S. PATENT DOCUMENTS

| | | | | |
|---|---|---|---|---|
| 6,174,980 | B1 * | 1/2001 | Hirata ................. | C04B 24/2647 524/4 |
| 6,388,038 | B1 | 5/2002 | Hirata et al. | |
| 2003/0125492 | A1 * | 7/2003 | Yamamoto .......... | C04B 24/2641 526/318.2 |
| 2005/0171325 | A1 * | 8/2005 | Matsui ................ | C04B 24/2658 528/272 |

FOREIGN PATENT DOCUMENTS

| | | |
|---|---|---|
| CN | 1189473 | 8/1998 |
| CN | 1303875 | 7/2001 |
| JP | 58-074552 | 5/1983 |
| JP | 3683176 B | 8/2005 |
| JP | 2007-063090 | 3/2007 |
| JP | 2008/069070 | 3/2008 |
| JP | 2008-247730 | 10/2008 |
| JP | 2011-057534 | 3/2011 |
| WO | 2004/005213 | 1/2004 |

* cited by examiner

*Primary Examiner* — Michael M Bernshteyn
(74) *Attorney, Agent, or Firm* — Hamre, Schumann, Mueller & Larson P.C.

(57) ABSTRACT

The present invention aims to provide a polycarboxylic acid copolymer which is excellent in various properties, in particular dispersibility, and is useful in various uses such as dispersants and admixtures for cement. The present invention also aims to provide a dispersant for cement, an admixture for cement, and a cement composition each containing the above polycarboxylic acid copolymer. The polycarboxylic acid copolymer of the present invention includes a structural unit (I) derived from an unsaturated polyalkylene glycol monomer (a) and a structural unit (II) derived from an unsaturated carboxylic acid monomer (b). The copolymer has a weight average molecular weight (Mw) of 5000 to 25000. The copolymer includes a dimer including two units of the unsaturated polyalkylene glycol monomer (a) bonded to each other, and has an area percentage of the dimer of 7% or higher.

10 Claims, 1 Drawing Sheet

POLYCARBOXYLIC COPOLYMER, CEMENT DISPERSION AGENT, CEMENT ADMIXTURE, AND CEMENT COMPOSITION

TECHNICAL FIELD

The present invention relates to a polycarboxylic acid copolymer, a dispersant for cement, an admixture for cement, and a cement composition.

BACKGROUND ART

Polycarboxylic acid copolymers having a polyalkylene glycol chain can have characteristics such as hydrophilicity, hydrophobicity, and steric repulsion as a result of adjusting their properties such as the chain length and the constitutional alkylene oxides. Thus, such copolymers are used in a wide variety of uses, including adhesives, sealants, dispersants, softening components, and detergent builders. Currently, the polycarboxylic acid copolymers are also expected to be used in admixtures for cement to be added to cement compositions, such as cement paste, mortar, and concrete.

Admixtures for cement have an ability to increase the fluidity of cement compositions so as to reduce the amount of water used in the cement compositions, thereby improving the properties such as strength and durability of the resulting hardened matter. Therefore, such admixtures are also called as water-reducing agents. Admixtures for cement which have an ability to disperse cement are also called as dispersants for cement. Admixtures for cement which contain a polycarboxylic acid polymer having a polyalkylene glycol chain among the admixtures (water-reducing agents) for cement exert a higher water-reducing ability than conventional naphthalene-type water-reducing agents, and thus achieve many good results as high-performance AE water-reducing agents. For example, dispersants and other additives for cement disclosed in Patent Literature 1 and Patent Literature 2 are very useful in the field of the art.

In recent years, researchers have proposed super-high-strength concrete having a low water-cement ratio. Such super-high-strength concrete is formed from cement containing silica fume. Such cement shows good workability even at a low water-cement ratio and excellently exerts strength in middle and long material age and strength of structures. For example, Patent Literature 3 proposes a polycarboxylic acid copolymer including structural units derived from a specific polyalkylene glycol ether monomer to be used with silica-fume-containing cement.

CITATION LIST

Patent Literature

Patent Literature 1: JP S58-74552 A
Patent Literature 2: JP 3683176 B
Patent Literature 3: JP 2008-247730 A

SUMMARY OF INVENTION

Technical Problem

As mentioned above, polycarboxylic acid copolymers having a polyalkylene glycol chain are useful in various uses. Still, the industry now requires higher properties (e.g., dispersibility, such as cement dispersibility), and thus further improvement in a series of properties, such as dispersibility, is a problem.

The present invention is devised in the above situation, and it aims to provide a polycarboxylic acid copolymer which is excellent in various properties, especially dispersibility, and which is useful in various uses such as dispersants and admixtures for cement. The present invention particularly aims to provide a polycarboxylic acid copolymer for dispersants for cement which shows high fluidity when used with cement compositions such as super-high-strength cement paste having a low water-cement ratio, mortar, and concrete. The present invention also aims to provide a dispersant for cement, an admixture for cement, and a cement composition each containing the above polycarboxylic acid copolymer.

Solution to Problem

The present inventors have performed various studies to focus on the following fact. That is, a polycarboxylic acid copolymer including a structural unit derived from an unsaturated polyalkylene glycol monomer with a predetermined structure and a structural unit derived from an unsaturated carboxylic acid monomer is excellent in dispersibility (also called as fluidity or a water-reducing ability), so that it is useful in various uses, especially as a main component of admixtures for cement and dispersants for cement. Then, the inventors have found that the copolymer can exert high fluidity even used with super-high-strength concrete having a low water-cement ratio when the weight average molecular weight of this copolymer is adjusted to 5000 to 25000 and the amount of the dimer including two units of the unsaturated polyalkylene glycol monomer bonded to each other is adjusted to a predetermined amount or more. Finally, the inventors have arrived at the solution of the above problem and completed the present invention.

In other words, the present invention relates to a polycarboxylic acid copolymer comprising:

a structural unit (I) derived from an unsaturated polyalkylene glycol monomer (a) represented by the following formula (1):

[Chem. 1]

(1)

wherein $R^1$ and $R^2$ may be the same as or different from each other and each represent a hydrogen atom or a methyl group; p is an integer of 0 to 2; q is 0 or 1; AOs may be the same as or different from each other and each represent a C2-C18 oxyalkylene group; and n is an average number of moles of the oxyalkylene groups represented by AOs added, and is 20 to 300; and a structural unit (II) derived from an unsaturated carboxylic acid monomer (b), the copolymer having a weight average molecular weight (Mw) of 5000 to 25000, the copolymer including a dimer including two units of the unsaturated polyalkylene glycol monomer (a) bonded to each other and having an area percentage of the dimer of 7% or greater, where the area percentage is defined through the following steps (1) to (8):

(1) determining the weight average molecular weight of the copolymer by gel permeation chromatography (GPC);

(2) drawing a base line between A0 and B0, where A0 represents the starting point of the resulting GPC chart of the copolymer and B0 represents the end point of a region where the remaining unsaturated polyalkylene glycol monomer (a) is detected;

(3) letting P1 be the first minimal point from the low molecular weight side on the GPC chart of the copolymer;

(4) drawing a line vertically from P1 to L1, where L1 represents the intersection point between the vertical line and the base line;

(5) similarly, letting P2 be the second minimal point from the low molecular weight side in the GPC chart, and drawing a line vertically from P2 to L2, where L2 represents the intersection point between the vertical line and the base line;

(6) letting S1 be the area surrounded by P1, P2, L1, and L2;

(7) letting S be the whole area surrounded by the resulting GPC chart and the base line; and (8) defining the percentage of the area S1 to the area S (S1/S×100) as the area percentage (%) of the dimer including two units of the unsaturated polyalkylene glycol monomer (a) bonded to each other.

The present invention also relates to a dispersant for cement containing the polycarboxylic acid copolymer.

The present invention also relates to an admixture for cement containing the polycarboxylic acid copolymer.

The present invention also relates to a cement composition containing the polycarboxylic acid copolymer, silica fume cement, and water.

The present invention will be described in detail below. Any combination of two or more preferable embodiments of the present invention to be mentioned below is also a preferable embodiment of the present invention.

[Polycarboxylic Acid Copolymer]

The polycarboxylic acid copolymer (hereinafter, also referred to as the "copolymer" or the "copolymer (A)") of the present invention is a copolymer including a structural unit (I) derived from an unsaturated polyalkylene glycol monomer (a) (hereinafter, also referred to as a "monomer (a)") represented by the formula (1) and a structural unit (II) derived from an unsaturated carboxylic acid monomer (b) (hereinafter, also referred to as "monomer (b)"). The copolymer is preferably obtained by polymerizing a monomer component including the monomer (a) and the monomer (b). The monomers in the monomer component each may include one monomer species or two or more monomer species.

Each structural unit is a structure derived from the corresponding monomer as a result of conversion from a polymerizable double bond (carbon-carbon double bond) in the original monomer into a single bond.

If the copolymer (A) has too high a weight average molecular weight (Mw), it causes aggregation of a substance to be dispersed, such as cement. If the copolymer (A) has too low a weight average molecular weight (Mw), in contrast, it less adsorbs to a substance to be dispersed, such as cement. Thus, the weight average molecular weight (Mw) of the copolymer (A) is appropriately 5000 to 25000. The upper limit of the weight average molecular weight is preferably 23000 or lower, more preferably 22000 or lower, still more preferably 20000 or lower, and much more preferably 15000 or lower. In particular, an embodiment where the polycarboxylic acid copolymer has a weight average molecular weight (Mw) of 5000 to 15000 is one preferable embodiment of the present invention. Such a weight average molecular weight can lead to improvement in dispersibility such as cement dispersibility. The weight average molecular weight is still much more preferably 13000 or lower, and most preferably 10000 or lower. The lower limit thereof is preferably 7000 or higher.

The weight average molecular weight of the copolymer can be determined by gel permeation chromatography (also abbreviated as GPC; device: Waters Alliance (2695), Waters Corp.; columns: TSK guard column SWXL+TSKgel G4000SWXL+G3000SWXL+G2000SWXL, TOSOH CORP.) using polyethylene glycol as a standard substance, which is to be described in "EXAPLES" below.

<Unsaturated Polyalkylene Glycol Monomer (a)>

The monomer (a) is a compound represented by the above formula (1).

In the formula (1), AOs may be the same as or different from each other, and each represent a C2-C18 oxyalkylene group. AOs may include one oxyalkylene species or two or more oxyalkylene species. With two or more oxyalkylene species, they may be added by any addition mode, including random addition, block addition, and alternating addition.

The carbon number of each oxyalkylene group expressed as AO is preferably 2 to 8, and more preferably 2 to 4.

Examples of the C2-C18 oxyalkylene group include structures derived from ethylene oxide, propylene oxide, butylene oxide, isobutylene oxide, 1-butene oxide, and 2-butene oxide. Preferred are an oxyethylene group and an oxypropylene group. More preferred are those including an oxyethylene group as a main component.

The phrase "including an oxyethylene group as a main component" herein means that, where the oxyalkylene groups (AOs) include two or more oxyalkylene species, ethylene oxide occupies a large part of the number of moles of the whole alkylene oxide constituting the oxyalkylene groups. As the oxyalkylene groups (AOs) include an oxyethylene group as a main component, the copolymer (A) has a good balance between hydrophilicity and hydrophobicity. As a result, the copolymer (A) can more sufficiently exerts its effects. Specifically, in 100 mol % of all the oxyalkylene groups (AOs), the amount of oxyethylene groups is preferably 50 to 100 mol %, more preferably 60 to 100 mol %, still more preferably 70 to 100 mol %, particularly preferably 80 to 100 mol %, and most preferably 90 to 100 mol %.

In the formula (1), n represents an average number of moles of oxyalkylene groups (AOs) added, and it is 20 to 300. With an average number of moles of oxyalkylene groups (AOs) added within the above range, the monomer (a) has sufficient polymerizability and the copolymer (A) has sufficient hydrophilicity. Here, n is preferably 20 to 100, more preferably 20 to 75, and still more preferably 25 to 50.

In the formula (1), $R^1$ and $R^2$ may be the same as or different from each other, and each represent a hydrogen atom or a methyl group; and p is 0, 1, or 2. Thus, an alkenyl group represented by "$C(R^1)H=C(R^2)-(CH_2)_p-$" corresponds to a C2-C6 alkenyl group. The carbon number of this alkenyl is preferably 3 to 5.

Examples of the alkenyl group represented by "$C(R^1)H=C(R^2)-(CH_2)_p-$" include a vinyl group, an allyl group, a methallyl group, a 3-butenyl group, and a 3-methyl-3-butenyl group. Preferred are a vinyl group, an allyl group, a methallyl group, and a 3-methyl-3-butenyl group.

It is preferable that $R^1$ is a hydrogen atom and $R^2$ is a methyl group. Such an embodiment is one preferable embodiment of the present invention.

In the formula (1), q is 0 or 1. If q is 0, the monomer (a) is a monomer having an ether structure (this monomer is also referred to as an ether monomer). If q is 1, the monomer (a) is a monomer having an ester structure (this monomer is also referred to as an ester monomer). Preferably, q is 0; in other words, the monomer (a) is an ether monomer. This can increase the dispersibility.

If the monomer (a) is an ether monomer, specific examples of the monomer include unsaturated alcohol polyalkylene glycol adducts, in other words, compounds having a structure where a polyalkylene glycol chain is added to an unsaturated group-containing alcohol (referred to as an unsaturated alcohol). Such compounds are obtained by adding an alkylene glycol (also referred to as an alkylene oxide) to an unsaturated alcohol, for example.

The monomer (a) is preferably a compound (hereinafter, also referred to as an "unsaturated polyalkylene glycol ether monomer") represented by the following formula (2):

$$Y\text{—}O\text{-}(AO)_n\text{—}H \qquad (2)$$

wherein Y represents a C2-C6 alkenyl group; AOs may be the same as or different from each other and each represent a C2-C18 oxyalkylene group; and n is an average number of moles of oxyalkylene groups (AOs) added, and it is 20 to 300. An embodiment where the monomer (a) is represented by the formula (2) is one preferable embodiment of the present invention.

In the formula (2), Y represents a C2-C6 alkenyl group; and the carbon number of the alkenyl group is preferably 3 to 5.

Examples of the C2-C6 alkenyl group include a vinyl group, an allyl group, a methallyl group, a 3-butenyl group, and a 3-methyl-3-butenyl group. Preferred are a vinyl group, an allyl group, a methallyl group, and a 3-methyl-3-butenyl group.

The unsaturated polyalkylene glycol ether monomer is particularly preferably an unsaturated alcohol polyalkylene glycol adduct represented by the following formula (3):

[Chem. 2]

(3)

wherein $R^1$ and $R^2$ may be the same as or different from each other and each represent a hydrogen atom or a methyl group; AOs may be the same as or different from each other and each represent a C2-C18 oxyalkylene group; n is an average number of moles of oxyalkylene groups (AOs) added, and it is 20 to 300; and X is a C1-C2 divalent alkylene group or a direct bond.

In the formula (3), $R^1$, $R^2$, AO, and n are defined in the same manner as in the formula (1).

In the formula (3), X is a C1-C2 divalent alkylene group or a direct bond. If X is a direct bond, the carbon atom and the oxygen atom bonded to X in the formula (3) are directly bonded. X is preferably a C1-C2 divalent alkylene group. In other words, X is preferably a methylene group or an ethylene group.

Preferable examples of the unsaturated alcohol polyalkylene glycol adduct represented by the formula (3) include hydroxy(poly)ethylene glycol allyl ether, hydroxy(poly)ethylene glycol methallyl ether, hydroxy(poly)ethylene glycol 3-methyl-3-butenyl ether, hydroxy(poly)ethylene glycol tetramethylene glycol monovinyl ether, hydroxy(poly)ethylene(poly)propylene glycol allyl ether, hydroxy(poly)ethylene(poly)propylene glycol methallyl ether, hydroxy(poly)ethylene(poly)propylene glycol 3-methyl-3-butenyl ether, hydroxy(poly)ethylene(poly)propylene glycol tetramethylene glycol monovinyl ether, hydroxy(poly)ethylene(poly)butylene glycol allyl ether, hydroxy(poly)ethylene(poly)butylene glycol methallyl ether, hydroxy(poly)ethylene(poly)butylene glycol 3-methyl-3-butenyl ether, and hydroxy(poly)ethylene(poly)butylene glycol tetramethylene glycol monovinyl ether. In the present invention, one of these or two or more of these are particularly preferably used as the monomer (a) for forming the structural unit (I).

If the monomer (a) is an ether monomer, such as the unsaturated polyalkylene glycol ether monomer, the monomer (a) can be produced by any of various methods. In particular, the monomer (a) is preferably produced by the following method.

That is, for example, the monomer (a) is preferably produced by a method in which 20 to 300 mol of a C2-C18 alkylene oxide is added to an unsaturated alcohol in the presence of at least one of an alkali catalyst and an acid catalyst.

The unsaturated alcohol is preferably one or two or more of alcohols having a C2-C6 alkenyl group, such as allyl alcohol, methallyl alcohol, 3-methyl-3-buten-1-ol, 3-methyl-2-buten-1-ol, 2-methyl-2-buten-1-ol, and 4-hydroxybutyl vinyl ether.

Examples of the alkali catalyst include potassium hydroxide and sodium hydroxide. Examples of the acid catalyst include boron trifluoride and tin tetrachloride.

If the monomer (a) is an ester monomer, specific examples of the monomer include unsaturated polyalkylene glycol ester monomers, in other words, compounds having a structure where an unsaturated group and a polyalkylene glycol chain are bonded to each other via an ester bond. Preferable among these compounds are unsaturated carboxylic acid polyalkylene glycol ester compounds, and more preferred are (hydroxy)polyalkylene glycol mono(meth)acrylates.

The (hydroxy)polyalkylene glycol mono(meth)acrylates are preferably polyalkylene glycols with 20 to 300 mol of a C2-C18 alkylene oxide group being added thereto. More preferred are monoesterified products of (meth)acrylic acid and any of polyalkylene glycols which mainly contain ethylene oxide.

Specifically, preferable examples of the above esterified products include the following (hydroxy)polyethylene glycol (poly)(C2-C4 alkylene glycol)(meth)acrylic acid esters: hydroxy polyethylene glycol mono(meth)acrylate, hydroxy{polyethylene glycol(poly)propylene glycol}mono (meth)acrylate, hydroxy{polyethylene glycol(poly)butylene glycol}mono(meth)acrylate, and hydroxy{polyethylene glycol(poly)propylene glycol(poly)butylene glycol}mono (meth)acrylate.

<Unsaturated Carboxylic Acid Monomer (b)>

The unsaturated carboxylic acid monomer (b) may be any monomer having a polymerizable unsaturated group and at least one of a carboxyl group, which is an adsorbable group, and a structural moiety of its salt. The monomer (b) is preferably an unsaturated monocarboxylic acid monomer (b-1) such as a (meth)acrylic acid monomer. Specifically, one or two or more of acrylic acid, methacrylic acid, and crotonic acid, and monovalent metal salts, divalent metal salts, ammonium salts, and organic amine salts thereof can be used. In consideration of copolymerizability, at least one of (meth) acrylic acid and its salt is more preferred, and at least one of acrylic acid and its salt is still more preferred.

Examples of the monovalent metal atoms constituting the monovalent metal salts include lithium, sodium, and potassium. Examples of the divalent metal atoms constituting the divalent metal salts include calcium and magnesium. Examples of the organic amine groups constituting the organic amine salts include alkanol amine groups such as a monoethanol amine group, a diethanol amine group, and a triethanol amine group; alkyl amine groups such as a monoethyl amine group, a diethyl amine group, and a triethyl amine group; and polyamine groups such as an ethylene diamine group and a triethylene diamine group. If the monomer (b) is a salt, it is particularly preferably an ammonium salt or a monovalent metal salt. The monomer is more preferably a monovalent metal salt, still more preferably an ammonium salt, a sodium salt, or a potassium salt, and particularly preferably a sodium salt.

In the copolymer (A), the structural unit (I) derived from the monomer (a) and the structures (II) derived from the monomer (b) preferably satisfy a constitutional ratio ((I)/(II)) by mass of (55 to 90)/(10 to 45). The ratio is more preferably (70 to 90)/(10 to 30). Such a ratio makes it possible to exert the effects of the present invention more sufficiently. An embodiment where the structural unit (I) derived from the unsaturated polyalkylene glycol monomer (a) and the structural unit (II) derived from the unsaturated carboxylic acid monomer (b) satisfy a constitutional ratio ((I)/(II)) by mass of (70 to 90)/(10 to 30) is one preferable embodiment of the present invention. The constitutional ratio is still more preferably (75 to 85)/(15 to 25), and particularly preferably (80 to 85)/(20 to 15).

If the monomer (b) includes one or two or more species of the unsaturated monocarboxylic acid monomer (b-1), the structural unit (I) and a structural unit (II-1) derived from the unsaturated monocarboxylic acid monomer (b-1) preferably satisfy a constitutional ratio ((I)/(II-1)) by mass of (70 to 90)/(10 to 30). Such a constitutional ratio makes it possible to exert the effects of the present invention more sufficiently. The constitutional ratio is more preferably (75 to 85)/(15 to 25), and still more preferably (80 to 85)/(20 to 15).

In calculation of the ratio of the structural unit (II) derived from the unsaturated carboxylic acid monomer (b), the structural unit (II) is considered as a structural unit derived from a completely neutralized monomer (salt). In calculation of the ratio of the unsaturated carboxylic acid monomer (b), the monomer (b) is considered as a completely neutralized monomer (salt). If acrylic acid is used as a monomer (b) and it is completely neutralized with sodium hydroxide in the polymerization reaction, for example, the ratio by mass (% by mass) is calculated on the assumption that sodium acrylate is used as a monomer (b). If maleic acid is used as a monomer (b) and it is completely neutralized with sodium hydroxide in the polymerization reaction, the ratio by mass (% by mass) is calculated on the assumption that disodium maleate is used as a monomer (b).

The unsaturated carboxylic acid monomer (b) may also be an unsaturated dicarboxylic acid monomer (b-2), such as maleic acid, fumaric acid, and itaconic acid, and monovalent metal salts, divalent metal salts, ammonium salts, and organic amine salts thereof. One of these or two or more of these may be used. With respect to the salts, the aforementioned conditions shall be applied. In consideration of copolymerizability, the unsaturated dicarboxylic acid monomer (b-2) is preferably at least one of maleic acid and a salt thereof.

The copolymer (A) may also preferably be a copolymer obtained by polymerizing a monomer component including the monomer (a), the unsaturated monocarboxylic acid monomer (b-1), and the unsaturated dicarboxylic acid monomer (b-2). In other words, the copolymer (A) may also preferably be a copolymer including the structural unit (I), the structural unit (II-1), and a structural unit (II-2) derived from the unsaturated dicarboxylic acid monomer (b-2). In this case, the structural unit preferably satisfy a constitutional ratio ((I)/(II-1)/(II-2)) by mass of (55 to 85)/(10 to 30)/(5 to 15). As mentioned here, an embodiment where the unsaturated carboxylic acid monomer (b) includes the unsaturated monocarboxylic acid monomer (b-1) and the unsaturated dicarboxylic acid monomer (b-2), and where the structural unit (I) derived from the unsaturated polyalkylene glycol monomer (a), the structural unit (II-1) derived from the unsaturated monocarboxylic acid monomer (b-1), and the structural unit (II-2) derived from the unsaturated dicarboxylic acid monomer (b-2) satisfy a constitutional ratio ((I)/(II-1)/(II-2)) by mass of (55 to 85)/(10 to 30)/(5 to 15) is also one preferable embodiment of the present invention. The constitutional ratio is more preferably (60 to 85)/(10 to 25)/(5 to 15), and still more preferably (65 to 80)/(15 to 25)/(5 to 10).

<Other Monomers>

The monomer component may also include one or two or more of unsaturated monoacrylic acid ester monomers (c) as monomers copolymerizable with the monomer (a) and the monomer (b). In other words, the copolymer (A) may further include a structural unit (III) derived from the unsaturated monocarboxylic acid ester monomer (c). Such a structural unit (III) derived from the unsaturated monoacrylic acid ester monomer (c) is expected to make it possible to maintain the fluidity for a certain period of time.

Preferable examples of the unsaturated monoacrylic acid ester monomer (c) include methyl acrylate, ethyl acrylate, butyl acrylate, and 2-ethylhexyl acrylate. More preferred is at least one of methyl acrylate, ethyl acrylate, and butyl acrylate, and still more preferred is butyl acrylate.

If the copolymer (A) further includes the structural unit (III) derived from the unsaturated monocarboxylic acid ester monomer (c), the structural unit (I), the structural unit (II), and the structural unit (III) satisfy a constitutional ratio ((I)/(II)/(III)) by mass of (65 to 84)/(10 to 30)/(1 to 5). As mentioned here, an embodiment where the copolymer further includes the structural unit (III) derived from the unsaturated monocarboxylic acid ester monomer (c), and where the structural unit (I) derived from the unsaturated polyalkylene glycol monomer (a), the structural unit (II) derived from the unsaturated carboxylic acid monomer (b), and the structural unit (III) derived from the unsaturated monocarboxylic acid ester monomer (c) satisfy a constitutional ratio ((I)/(II)/(III)) by mass of (65 to 84)/(10 to 30)/(1 to 5) is also one preferable embodiment of the present invention. The constitutional ratio is more preferably (70 to 83)/(15 to 25)/(2 to 5).

The copolymer (A) may further include structural units derived from one or two or more of other copolymerizable monomers. The amount of such structural units is preferably 30% by mass or less in 100% by mass of all the structural units constituting the copolymer (A). The amount thereof is more preferably 20% by mass or less, and still more preferably 10% by mass or less.

Examples of such other copolymerizable monomers include the following monomers:

monoesters of (meth)acrylic acid and (alkoxy)polyalkylene glycols each of which are formed by adding 1 to 500 mol of a C2-C18 alkylene oxide to a C1-C30 alcohol; diesters of unsaturated dicarboxylic acid monomers (e.g., maleic acid, anhydrous maleic acid, fumaric acid, itaconic acid, and citraconic acid) and C1-C30 alcohols; diamides of the unsaturated dicarboxylic acid monomers and C1-C30 amines; diesters of alkyl (poly)alkylene glycols, in each of which 1 to 500 mol of a C2-C18 alkylene oxide is added to any of the above alcohols and amines, and the unsaturated dicarboxylic acid monomers; diesters of the unsaturated dicarboxylic acid monomers and C2-C18 glycols or polyalkylene glycols which are formed by adding 2 to 500 mol of the glycols; half-amides of maleamidic acid and C2-C18 glycols or polyalkylene glycols which are formed by adding 2 to 500 mol of the glycols; (poly)alkylene glycol di(meth)acrylates such as triethylene glycol di(meth)acrylate, (poly)ethylene glycol di(meth)acrylate, polypropylene glycol di(meth)acrylate, and (poly)ethylene glycol(poly)propylene glycol di(meth)acrylate; polyfunctional(meth)acrylates such as hexanediol di(meth)acrylate, trimethylolpropane tri(meth)acrylate, and trimethylolpropane di(meth)acrylate; (poly)alkylene glycol dimalates such as triethylene glycol dimalate and polyethylene glycol dimalate; unsaturated sulfonic acids such as vinyl sulfonate, (meth)allyl sulfonate, 2-(meth)acryloxyethyl sulfonate, 3-(meth)acryloxypropyl sulfonate, 3-(meth)acryloxy-2-hydroxypropyl sulfonate, 3-(meth)acryloxy-2-hydroxypropyl sulfophenyl ether, 3-(meth)acryloxy-2-hydroxypropyl oxysulfobenzoate, 4-(meth)acryloxybutyl sulfonate, (meth)acrylamidomethyl sulfonic acid, (meth)acrylamidoethyl sulfonic acid, 2-methylpropane sulfonic acid (meth)acrylamide, and styrene sulfonic acid, and monovalent metal salts, divalent metal salts, ammonium salts, and organic amine salts thereof;

amides of unsaturated monocarboxylic acids and C1-C30 amines, such as methyl (meth)acrylamide; vinyl aromatic compounds such as styrene, α-methylstyrene, vinyl toluene, and p-methylstyrene; alkanediol mono(meth)acrylates such as 1,4-butanediol mono(meth)acrylate, 1,5-pentanediol mono(meth)acrylate, and 1,6-hexanediol mono(meth)acrylate; dienes such as butadiene, isoprene, 2-methyl-1,3-butadiene, and 2-chloro-1,3-butadiene; unsaturated amides such as (meth)acrylamide, (meth)acryl alkyl amides, N-methylol (meth)acrylamide, and N,N-dimethyl(meth)acrylamide; unsaturated cyanides such as (meth)acrylonitrile and α-chloro acrylonitrile; unsaturated esters such as vinyl acetate and vinyl propionate; unsaturated amines such as aminoethyl(meth)acrylate, methyl aminoethyl(meth)acrylate, dimethyl aminoethyl(meth)acrylate, dimethyl aminopropyl(meth)acrylate, dibutyl aminoethyl(meth)acrylate, and vinyl pyridine; divinyl aromatic compounds such as divinyl benzene; cyanurates such as triallyl cyanurate; and siloxane derivatives such as polydimethylsiloxane propylamino maleamidic acid, polydimethylsiloxane aminopropylene amino maleamidic acid, polydimethylsiloxane-bis-(propylamino maleamidic acid), polydimethylsiloxane-bis-(dipropylene amino maleamidic acid), polydimethylsiloxane-(1-propyl-3-acrylate), polydimethylsiloxane-(1-propyl-3-methacrylate), polydimethylsiloxane-bis-(1-propyl-3-acrylate), and polydimethylsiloxane-bis-(1-propyl-3-methacrylate).

It is important that the copolymer (A) of the present invention includes a specific amount or more of an oligomer component including two or three units of the unsaturated polyalkylene glycol monomer (a) each bonded by a unit derived from the unsaturated carboxylic acid monomer (b). The amount of an oligomer component is proportional to the amount of the dimer including two units of the unsaturated polyalkylene glycol monomer (a) bonded by a unit of the unsaturated carboxylic acid monomer (b). Thus, the amount of the dimer is preferably a specific amount or more. Too less an amount of the oligomer component may decrease the fluidity of a cement composition having a low water-cement ratio. The amount of the dimer can be determined on the basis of the area percentage determined by the following GPC measurement. This is described below referring to FIG. 1.

Figure 1:
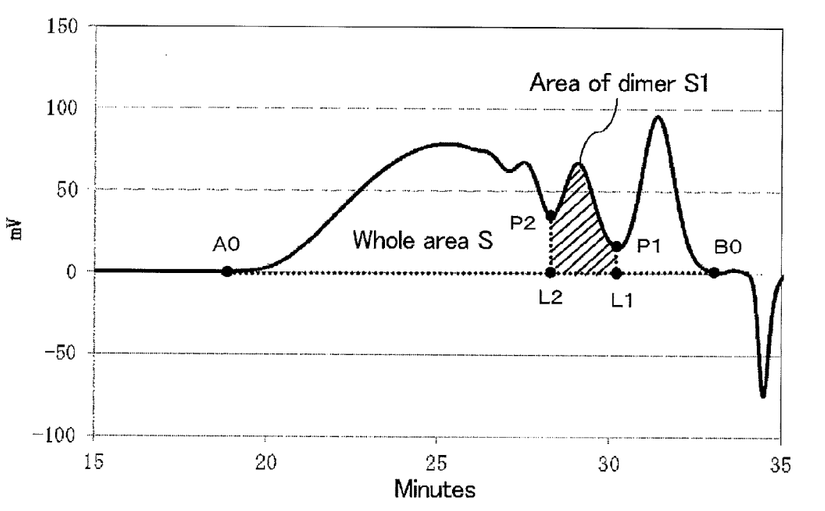
FIG. 1 is a schematic diagram shown so as to define the area percentage (%) of the dimer including two units of the unsaturated polyalkylene glycol monomer (a) boned to each other.

(1) Determine the weight average molecular weight of the copolymer (A) by gel permeation chromatography (GPC). The GPC conditions are described in "EXAMPLES" below.

(2) Draw a base line between A0 and B0 on the resulting GPC chart of the copolymer (A), where A0 represents the starting point and B0 represents the end point of a region where the remaining unsaturated polyalkylene glycol monomer (a) is detected.

(3) Let P1 be the first minimal point from the low molecular weight side on the GPC chart of the copolymer (A).

(4) Draw a line vertically from P1 to L1, where L1 represents the intersection point between the vertical line and the base line.

(5) Similarly, let P2 be the second minimal point from the low molecular weight side of the GPC chart. Then, draw a line vertically from P2 to L2, where L2 represents the intersection point between the vertical line and the base line.

(6) Let S1 be the area surrounded by P1, P2, L1, and L2.

(7) Let S be the whole area surrounded by the resulting GPC chart and the base line.

(8) Finally, define the percentage of the area S1 to the area S (S1/S×100) as the area percentage (%) of the dimer including two units of the unsaturated polyalkylene glycol monomer (a) bonded to each other.

In FIG. 1, the region surrounded by A0, P2, L2, and the base line is a region mainly containing the copolymer (A), the region S1 surrounded by L2, P2, P1, L1, and the base line is a region mainly containing the dimer, and the region surrounded by L1, P1, B0, and the base line is a region mainly containing monomers. This is clear from the molecular weights in these regions.

The area percentage (%) of the dimer defined by the steps (1) to (8) is appropriately 7% or higher. If the area percentage (%) of the dimer is lower than 7%, the amount of an oligomer component is insufficient. This may cause a failure in exerting sufficient cement fluidity. The area percentage is preferably 7.3% or higher, more preferably 7.5% or higher, still more preferably 8% or higher, particularly preferably 9% or higher, and most preferably 10% or higher. In contrast, the area percentage (%) may have any upper limit which allows the copolymer to exert cement fluidity. Still, the upper limit thereof is preferably 80% or lower, more preferably 50% or lower, still more preferably 40% or lower, and particularly preferably 30% or lower.

The copolymer (A) can be produced by copolymerizing a monomer component including the unsaturated polyalkylene glycol monomer (a) and the unsaturated carboxylic acid monomer (b). Still, the production method is not limited to this. For example, a monomer to which an alkylene oxide is not yet added, in other words, an unsaturated alcohol such as methallyl alcohol, is used instead of the monomer (a), and this unsaturated alcohol is copolymerized with the monomer (b) in the presence of a polymerization initiator (if necessary, other monomers copolymerizable with these monomers may further be copolymerized). Then, 20 to 300 mol on average of an alkylene oxide is added to the copolymer.

The aforementioned area percentage of the dimer in the copolymer (A) of the present invention can be achieved by combining preferable production methods described herein and by adjusting the weight average molecular weight and, if necessary, the constitutional ratio of the structural units within the aforementioned range. In particular, the weight average molecular weight and the constitutional ratio of the structural units presumably have an influence on the area percentage (amount) of the dimer. In radical polymerization, the amount of the dimer depends on the molecular weight of the copolymer (A) to some extent. Too large a molecular weight may fail to stop the reaction at a dimer stage and the amount of the dimer may thus decrease. With too high a ratio of the unsaturated carboxylic acid monomer (b) (especially, the unsaturated monocarboxylic acid monomer (b-1)), polymerization of the unsaturated polyalkylene glycol monomer (a) proceeds and the amount of the dimer may fail to reach the specific amount or more even with a low molecular weight. The production method presumably naturally affects the amount of the dimer. In living radical polymerization, for example, the resulting copolymer is likely to have an even molecular weight, so that the amount of the dimer is assumed to be small. If the side chain length of the unsaturated polyalkylene glycol monomer (a) is as short as about 10 mol, for example, the dimer is difficult to distinguish from the other respective oligomer units on the GPC chart. Thus, the dimer is presumably difficult to quantify.

The copolymerization reaction can be performed with a polymerization initiator, including polymerization in solvent and bulk polymerization. The amounts of monomers in the copolymerization reaction are preferably appropriately adjusted in consideration of the reactivity of the monomers during the copolymerization reaction so as to allow the ratio of the structural units of the polymer to be within the above range.

The polymerization in a solvent may be performed in a batch mode or a continuous mode. Preferable examples of the solvent to be used include water; lower alcohols such as methyl alcohol, ethyl alcohol, and isopropyl alcohol; aromatic or aliphatic hydrocarbons such as benzene, toluene, xylene, cyclohexane, and n-hexane; ester compounds such as ethyl acetate; and ketone compounds such as acetone and methyl ethyl ketone. These solvents may be used alone or may be used in combination of two or more of these. In consideration of the solubilities of material monomers and the resulting copolymer (A), and the convenience of the copolymer (A) in use, the solvent is preferably at least one selected from the group consisting of water and C1-C4 lower alcohols. In this case, particularly effective among the C1-C4 lower alcohols is methyl alcohol, ethyl alcohol, and/or isopropyl alcohol.

In the aqueous solution polymerization, any water-soluble polymerization initiator may be used as a radical polymerization initiator, and examples thereof include persulfates such as ammonium persulfate, sodium persulfate, and potassium persulfate; hydrogen peroxide; and water-soluble azo initiators, including azo amidine compounds such as 2,2'-azobis-2-methyl propionamidine hydrochloride, cyclic azo amidine compounds such as 2,2'-azobis-2-(2-imidazolin-2-yl)propane hydrochloride, and azo nitrile compounds such as 2-carbamoyl azoisobutyronitrile. Such an initiator may be used in combination with any accelerator, including alkali metal sulfites such as sodium hydrogen sulfite, metabisulfite, sodium hypophosphite, Fe(II) salts such as Mohr's salt, sodium hydroxymethanesulfinate dihydrate, hydroxyl amine hydrochloride, thiourea, L-ascorbic acid (salt), and erythorbic acid (salt). If hydrogen peroxide is used as a water-soluble polymerization initiator, it is preferably used in combination with an accelerator such as L-ascorbic acid (salt).

In polymerization using a lower alcohol, an aromatic hydrocarbon, an aliphatic hydrocarbon, an ester compound, or a ketone compound as a solvent, any of peroxides such as benzoyl peroxide and lauroyl peroxide; hydroperoxides such as cumene hydroperoxide; and azo compounds such as azobisisobutyronitrile is used as a polymerization initiator. In this case, any accelerator such as an amine compound may be used in combination. If a solvent mixture of water and a lower alcohol is used, any of the above various polymerization initiators or any combination of the polymerization initiators and the accelerators may appropriately be used. The polymerization temperature is appropriately be adjusted in accordance with a solvent to be used and a polymerization initiator to be used, and it is usually 0 to 120° C.

In the bulk polymerization, a polymerization initiator is selected from peroxides such as benzoyl peroxide and lauroyl peroxide; hydroperoxides such as cumene hydroperoxide; and azo compounds such as azobisisobutyronitrile. The bulk polymerization is performed at a temperature of 50 to 200° C.

The respective monomers may be charged into a reaction vessel by any method. All the monomers may collectively be charged into a reaction vessel at an early stage; all the monomers may separately or continually be charged into a reaction vessel; or part of the monomers may be charged into a reaction vessel at an early stage and the remaining may separately or continually be charged into a reaction vessel. Specifically, preferable examples of the charging method include the following methods (1) to (4).

(1) All the monomers are continually charged into a reaction vessel.

(2) The whole monomer (a) is charged into a reaction vessel at an early stage, and then all the other monomers are continually charged into a reaction vessel.

(3) Part of the monomer (a) is charged into a reaction vessel at an early stage, and the remaining monomer (a) and all the other monomers are continually charged into a reaction vessel.

(4) Part of the monomer (a) and part of the other monomers are charged into a reaction vessel at an early stage, and portions of the remaining monomer (a) and portions of the other remaining monomers are separately alternately charged into a reaction vessel in several times.

Alternatively, the ratio by mass of each monomer supplied per unit time may be changed in a continuous or phased manner by changing the rate of supplying each monomer into the reaction vessel in a continuous or phased manner during the reaction so as to synthesize a mixture of copolymers each having a different ratio of structural units in the copolymer during the polymerization reaction. A radical polymerization initiator may be charged into a reaction vessel at the beginning, or may be dropwise added to a reaction vessel, or these methods may be combined as appropriate.

In order to adjust the molecular weight of the resulting copolymer (A), a chain transfer agent may be used in combination. Examples of the chain transfer agent include known hydrophilic chain transfer agents, including thiol chain transfer agents such as mercaptoethanol, thioglycerol, thioglycolic acid, 3-mercaptopropionic acid, thiomalic acid, and 2-mercaptoethane sulfonic acid; secondary alcohols such as isopropyl alcohol; and lower oxides and salts thereof such as phosphorous acid and hypophosphorous acid, and salts thereof (e.g., sodium hypophosphite and potassium hypophosphite), and sulfurous acid, hydrogen sulfite, dithionous acid, and metabisulfurous acid, and salts thereof (e.g., sodium sulfite, sodium hydrogen sulfite, sodium dithionite, and sodium metabisulfite). Further, a hydrophobic chain transfer agent is useful for improving the viscosity of a cement composition. Preferable examples of the hydrophobic chain transfer agent include thiol chain transfer agents with a hydrocarbon group having three or more carbon atoms, such as butanethiol, octanethiol, decanethiol, dodecanethiol, hexadecanethiol, octadecanethiol, cyclohexylmercaptan, thiophenol, octyl thioglycolate, and octyl 3-mercaptopropionate. Two or more chain transfer agents may be used in combination. For example, a hydrophilic chain transfer agent and a hydrophobic chain transfer agent may be combined. In order to adjust the molecular weight of the copolymer, other copolymerizable monomers may usefully include a monomer having a high chain-transferring ability, such as (meth)allyl sulfonic acid (salts).

Production of the copolymer (A) having a predetermined molecular weight with good reproducibility requires stable progress of the copolymerization reaction. Thus, in solution polymerization, a solvent to be used preferably has a dissolved oxygen concentration at 25° C. of 5 ppm or less. The dissolved oxygen concentration is more preferably 0.01 to 4 ppm, still more preferably 0.01 to 2 ppm, and most preferably 0.01 to 1 ppm. If nitrogen purge is performed after addition of the monomers to the solvent, the dissolved oxygen concentration in the system including even the monomers is preferably within the above range.

The dissolved oxygen concentration in a solvent may be adjusted in a polymerization reaction vessel, or the dissolved oxygen amount may be adjusted in advance. The oxygen in a solvent may preferably be purged by any of the following methods (1) to (5).

(1) Inert gas such as nitrogen is pressure-fed into an airtight container containing a solvent, and then the pressure in the airtight container is reduced so that the partial pressure of the oxygen in the solvent is reduced. The pressure in the airtight container may be reduced under nitrogen stream.

(2) The liquid phase in the container containing a solvent is vigorously stirred for a long time while the gas phase is replaced by inert gas such as nitrogen.

(3) Inert gas such as nitrogen is bubbled into a solvent in a container for a long time.

(4) A solvent is brought to a boil, and then cooled in an atmosphere of inert gas such as nitrogen.

(5) A static mixer is placed in the middle of piping for delivering a solvent to a polymerization reaction vessel, and the mixer mixes inert gas such as nitrogen with the solvent in the piping.

The copolymer (A) produced as mentioned above can directly be used in various uses (e.g., admixtures for cement and dispersants for cement). If necessary, the copolymer (A) may be neutralized with an alkaline substance. Preferable examples of the alkaline substance include inorganic salts such as hydroxides and carbonates of monovalent metals and divalent metals; ammonia; and organic amines. After the reaction, the concentration may be adjusted, if necessary.

[Uses]

The polycarboxylic acid copolymer of the present invention can exert good performance as a dispersant for water-insoluble inorganic or organic matter. Specifically, it can exert good performance as a dispersant for inorganic pigments such as heavy or light calcium carbonate and clay for paper coating; and as a dispersant for water slurry such as cement and coal. In addition, the copolymer can also be used in admixtures for cement; scale-inhibiting water-treating agents in cooling water systems, boiler water systems, desalinating devices, pulp digesters, and black-liquor-condensing tanks; scale inhibitors; fiber-treating agents such as dyeing auxiliaries and antistatic auxiliaries for fibers; adhesives; sealants; softening components for polymers; and detergent builders. The copolymer can also be used in body cleaners such as shampoos, conditioners, and body soap, and can be applied to a wide variety of fields such as fiber processing industry, building material processing industry, paint industry, and ceramic industry. The copolymer is particularly preferably used in an admixture for cement. As mentioned above, an embodiment where the polycarboxylic acid copolymer is a copolymer for dispersants and an embodiment where the polycarboxylic acid copolymer is a polycarboxylic acid copolymer for dispersants for cement (in other words, an embodiment where the polycarboxylic acid copolymer is used in a dispersant for cement) are also preferable embodiments of the present invention. A dispersant for cement containing the polycarboxylic acid copolymer and an admixture for cement containing the polycarboxylic acid copolymer are also within the scope of the present invention.

The dispersant for cement herein means one having cement dispersibility among the admixtures for cement.

[Dispersant for Cement, Admixture for Cement, and Cement Composition]

The dispersant for cement and the admixture for cement of the present invention each contain the aforementioned polycarboxylic acid copolymer (copolymer (A)) as an essential component. In this case, the copolymer (A) in the form of an aqueous solution may directly be used as a main component of the dispersant for cement or the admixture for cement. Alternatively, the copolymer (A) may be formed into powder and then used; here, the copolymer (A) may be formed into powder after the copolymer is neutralized with a hydroxide of a divalent metal, such as calcium or magnesium, to form a polyvalent metal salt and then dried, or after the copolymer is supported by inorganic powder, such as silica fine powder, and then dried.

The dispersant for cement and the admixture for cement can be used in a wide variety of hydraulic material, in other words, cement or those other than cement, such as gypsum. A hydraulic composition containing hydraulic material, water, and the admixture for cement of the present invention or an admixture for cement, and optionally fine aggregate (e.g., sand) or coarse aggregate (e.g., macadam) may suitably be cement paste, mortar, concrete, or plaster.

The most popular one among the aforementioned hydraulic compositions is a cement composition containing cement as a hydraulic material. Such a cement composition contains the dispersant for cement or the admixture for cement of the present invention, cement, and water as essential components. Such a cement composition is also one preferable embodiment of the present invention.

Preferable examples of the cement used in the cement composition include Portland cement (e.g., ordinary, high early strength, ultra-high early strength, moderate-heat, and sulfate-resistant cement, and low-alkali cement thereof), mixed cement (e.g., blast-furnace slag cement, silica cement, and fly ash cement), white Portland cement, alumina cement, ultra-rapid hardening cement (e.g., 1 clinker rapid hardening cement, 2 clinker rapid hardening cement, and magnesium phosphate cement), grouting cement, oil well cement, low-heat cement (e.g., low-heat blast-furnace slag cement, fly ash-mixed low-heat blast-furnace slag cement, and high belite cement), super-high-strength cement, cement solidifying material, ecocement (cement formed from one or more materials selected from municipal solid waste incineration ash and sewage sludge incineration ash). In addition, the cement composition may contain any of fine powder such as blast-furnace slag, fly ash, cinder ash, clinker ash, husk ash, silica fume, silica powder, and limestone powder, and gypsum. Further, refractory aggregates such as silica material, clay material, zircon material, high alumina material, silicon carbide material, graphite material, chromium material, chrome-magnesite material, and magnesia material may also be used as an aggregate in addition to gravel, macadam, granulated slag, and recycled aggregate. Particularly preferred is silica fume cement containing silica fume. As mentioned here, a cement composition that contains the polycarboxylic acid copolymer (copolymer (A)), silica fume cement, and water is also one aspect of the present invention.

The water content, the total amount of cement and silica fume (hereinafter, cement and silica fume are also collectively referred to as the component "B"), and the water-B ratio per cubic meter in the cement composition of the present invention are as follows. Preferably, the water content is 100 to 185 kg/m$^3$, the B content is 250 to 800 kg/m$^3$, and the water-B ratio (by mass) is 0.1 to 0.7. More preferably, the water content is 120 to 175 kg/m$^3$, the B content is 270 to 800 kg/m$^3$, and the water-B ratio (by mass) is 0.1 to 0.65. Thus, the cement composition of the present invention can be used in a wide variety of mixes, from poor mix to rich mix. Still, the cement composition is useful for high-strength concrete with a B content of 500 kg/m$^3$ or more and super-high-strength concrete with a B content of 900 kg/m$^3$ or more. In the present invention, even a cement composition having a low water-B ratio (by mass) can exert excellent fluidity. Such an effect is more sufficiently observed at a water-B ratio (by mass) of 0.5 or lower. The water-B ratio (by mass) is more preferably 0.4 or lower, still more preferably 0.35 or lower, even more preferably 0.3 or lower, particularly preferably 0.25 or lower, and most preferably 0.2 or lower.

In the cement composition of the present invention, the compositional ratio of the polycarboxylic acid copolymer (copolymer (A)) of the present invention in the case of mortar or concrete using hydraulic cement, for example, is preferably 0.01 to 5.0 parts by mass in terms of solid content for 100 parts by mass in total of cement and silica fume. Such addition leads to various preferable effects, such as reduction in unit water content, increase in strength, and improvement in durability. Less than 0.01 parts by mass of the copolymer (A) may exert insufficient performance. A large amount of more than 5.0 parts by mass of the copolymer (A) may substantially fail to further improve the effects and may cause an economic disadvantage. The compositional ratio of the copolymer (A) is more preferably 0.02 parts by mass or more but 3.0 parts by mass or less, and still more preferably 0.1 parts by mass or more but 2.0 parts by mass or less. The copolymer (A) is added such that it at least satisfies the above compositional ratio. The compositional ratio falls within a range of more preferably 0.2 to 1.5 parts by mass, and still more preferably 0.5 to 1.0 parts by mass.

The dispersant for cement and the admixture for cement of the present invention can be used together with an agent conventionally used as a dispersant for cement, and may be used together with multiple agents conventionally used as dispersants for cement. With a conventionally used dispersant for cement, the compositional ratio by mass of the conventional dispersant for cement to the dispersant for cement or admixture for cement of the present invention depends on the type of the dispersant for cement, the formulation, and the test conditions, and thus is not uniquely determined. Still, the ratio is preferably (1 to 99)/(99 to 1), more preferably (5 to 95)/(95 to 5), and still more preferably (10 to 90)/(90 to 10).

The cement composition of the present invention can also be useful in mortar and concrete which are required to have high fluidity, such as ready-mixed concrete, concrete for concrete secondary products (precast concrete), centrifugal concrete, vibrated concrete, steam-cured concrete, and spray concrete, as well as middle-performance concrete (concrete with a slump value of 22 to 25 cm), high-performance concrete (concrete with a slump value of 25 cm or higher and a slump flow value of 50 to 70 cm), self-compacting concrete, and self-leveling material.

The cement composition of the present invention can also contain any conventional additives (materials) for cement, such as additives (1) to (20) exemplified below.

(1) Water-soluble polymer substances: examples thereof include unsaturated carboxylic acid polymers such as polyacrylic acid (and sodium polyacrylate), polymethacrylic acid (and sodium polymethacrylate), polymaleic acid (and sodium polymaleate), and a sodium salt of a copolymer of acrylic acid and maleic acid; polyoxyethylene or polyoxypropylene polymers such as polyethylene glycol and polypropylene glycol, and copolymers thereof; nonionic cellulose ethers such as methyl cellulose, ethyl cellulose, hydroxymethyl cellulose, hydroxyethyl cellulose, carboxymethyl cellulose, carboxyethyl cellulose, and hydroxypropyl cellulose; polysaccharides produced by microorganic fermentation such as yeast glucan, xanthan gum, and β-1,3 glucans (linear ones and branched ones, e.g., curdlan, paramylon, pachyman, scleroglucan, and laminaran); polyacrylamide; polyvinyl alcohol; starch; starch phosphate; sodium alginate; gelatin; and copolymers of acrylic acid having an amino group in the molecule and quaternary compounds thereof.

(2) Polymer emulsions: examples thereof include copolymers of various vinyl monomers such as alkyl(meth)acrylates.

(3) Retarders: examples thereof include oxycarboxylic acids such as gluconic acid, glucoheptonic acid, arabonic acid, malic acid or citric acid, and inorganic salts and organic salts thereof, including sodium salts, potassium salts, calcium salts, magnesium salts, ammonium salts, and triethanolamine; saccharides, including monosaccharides such as glucose, fructose, galactose, saccharose, xylose, apiose, ribose, and high-fructose corn syrup, oligosaccharides such as disaccharides and trisaccharides, oligosaccharides such as dextrin, and polysaccharides such as dextran, and refinery molasses containing any of these saccharides; sugar alcohols such as sorbitol; magnesium silicofluoride; phosphoric acid and salts or boric acid ester thereof; aminocarboxylic acids and salts thereof; alkali-soluble proteins; humic acid; tannic acid; phenols; polyhydric alcohols such as glycerin; and phosphoric acid and derivatives thereof such as amino tri(methylene phosphoric acid), 1-hydroxyethylidene-1,1-diphosphoric acid, ethylenediamine tetra(methylene phosphoric acid), and diethylenetriamine penta(methylene phosphoric acid), and alkali metal salts and alkaline-earth metal salts thereof.

(4) High-early strengthening agents and accelerators: examples thereof include soluble calcium salts such as calcium chloride, calcium nitrite, calcium nitrate, calcium bromide, and calcium iodide; chlorides such as iron chloride and magnesium chloride; sulfates; potassium hydroxide; sodium hydroxide; carbonates; thiosulfates; formic acid and formic acid salts such as calcium formate; alkanolamines; alumina cement; and calcium aluminate silicate.

(5) Mineral-oil defoamers: examples thereof include kerosene and liquid paraffin.

(6) Fat-and-oil defoamers: examples thereof include animal and vegetable oils, sesame oil, and castor oil, and alkylene oxide adducts thereof.

(7) Fatty-acid defoamers: examples thereof include oleic acid and stearic acid, and alkylene oxide adducts thereof.

(8) Fatty-acid-ester defoamers: examples thereof include glycerin monoricinolate, alkenyl succinic acid derivatives, sorbitol monolaurate, sorbitol trioleate, and natural wax.

(9) Oxyalkylene defoamers: examples thereof include polyoxyalkylenes such as (poly)oxyethylene(poly)oxypropylene adducts; (poly)oxyalkyl ethers such as diethylene glycol heptyl ether, polyoxyethylene oleyl ether, polyoxypropylene butyl ether, polyoxyethylene polyoxypropylene 2-ethyl hexyl ether, and oxyethylene oxypropylene adducts of C12-C14 higher alcohols; (poly)oxyalkylene(alkyl)aryl ethers such as polyoxypropylene phenyl ether and polyoxyethylene nonylphenyl ether; acetylene ethers produced by addition polymerization of acetylene alcohol, such as 2,4,7,9-tetramethyl-5-decyne-4,7-diol, 2,5-dimethyl-3-hexyne-2,5-diol, and 3-methyl-1-butyn-3-ol, and alkylene oxide; (poly)oxyalkylene fatty acid esters such as diethylene glycol oleic acid ester, diethylene glycol lauric acid ester, and ethylene glycol distearic acid ester; (poly)oxyalkylene sorbitan fatty acid esters such as polyoxyethylene sorbitan monolauric acid ester and polyoxyethylene sorbitan trioleic acid ester; (poly)oxyalkylene alkyl(aryl)ether sulfuric acid ester salts such as polyoxypropylene methyl ether sodium sulfate and polyoxyethylene dodecylphenol ether sodium sulfate; (poly)oxyalkylene alkyl phosphoric acid esters such as (poly)oxyethylene stearyl phosphoric acid ester; (poly)oxyalkylene alkylamines such as polyoxyethylene laurylamine; and polyoxyalkyleneamides.

(10) Alcohol defoamers: examples thereof include octyl alcohols, hexadecyl alcohols, acetylene alcohols, and glycols.

(11) Amide defoamers: examples thereof include acrylate polyamine.

(12) Phosphoric acid ester defoamers: examples thereof include tributyl phosphate and sodium octylphosphate.

(13) Metal-soap defoamers: examples thereof include aluminum stearate and calcium oleate.

(14) Silicone defoamers: examples thereof include dimethyl silicone oil, silicone paste, silicone emulsion, organomodified polysiloxanes (polyorganosiloxanes such as dimethyl polysiloxane), and fluorosilicone oil.

(15) Air-entraining (AE) agents: examples thereof include resin soap, saturated or unsaturated fatty acids, sodium hydroxystearate, lauryl sulfate, alkyl benzene sulfonate (ABS), linear alkyl benzene sulfonate (LAS), alkane sulfonate, polyoxyethylene alkyl(phenyl)ether, polyoxyethylene alkyl(phenyl)ether sulfuric acid ester and salts thereof, polyoxyethylene alkyl(phenyl)ether phosphoric acid ester and salts thereof, protein materials, alkenyl sulfosuccinic acid, and α-olefin sulfonate.

(16) Other surfactants: examples thereof include polyalkylene oxide derivatives produced by adding 10 mol or more of an alkylene oxide (e.g., ethylene oxide and propylene oxide) to any of aliphatic monoalcohols having 6 to 30 carbon atoms in the molecule (e.g., octadecyl alcohol and stearyl alcohol), alicyclic monoalcohols having 6 to 30 carbon atoms in the molecule (e.g., abiethyl alcohol), monovalent mercaptans having 6 to 30 carbon atoms in the molecule (e.g., dodecyl mercaptan), alkyl phenols having 6 to 30 carbon atoms in the molecule (e.g., nonyl phenol), amines having 6 to 30 carbon atoms in the molecule (e.g., dodecyl amine), and carboxylic acids having 6 to 30 carbon atoms in the molecule (e.g., lauric acid and stearic acid); alkyl diphenyl ether sulfonic acid salts which may optionally have an alkyl group or an alkoxy group as a substituent and which has two ether-bonded phenyl groups each having a sulfone group; various anionic surfactants; various cationic surfactants such as alkyl amine acetates and alkyl trimethyl ammonium chlorides; various nonionic surfactants; and various amphoteric surfactants.

(17) Water repellents: examples thereof include fatty acids (and salts thereof), fatty acid esters, oils and fats, silicone, paraffin, asphalt, and wax.

(18) Anticorrosive agents: examples thereof include nitrous acid salts, phosphoric acid salts, and zinc oxide.

(19) Crack-reducing agents: examples thereof include polyoxyalkyl ethers.

(20) Expansive additives; examples thereof include ettringite materials and coal materials.

Examples of other conventionally used additives (materials) for cement include cement moistening agents, thickeners, separation-reducing agents, flocculants, dry shrinkage-reducing agents, strength-increasing admixtures, self-leveling agents, anticorrosives, colorants, and mold inhibitors. These conventional additives (materials) for cement may be used in combination.

With respect to the components other than cement, silica fume, and water in the cement composition of the present invention, particularly preferable embodiments thereof are the following embodiments 1) to 4).

1) Combination of (1) the polycarboxylic acid copolymer (copolymer (A)) of the present invention and (2) an oxyalkylene defoamer. The amount of the oxyalkylene defoamer as the component (2) is preferably 0.01 to 10 parts by mass for 100 parts by mass of the solid content of the copolymer (A) as the component (1).

2) Combination of (1) the polycarboxylic acid copolymer (copolymer (A)) of the present invention and (2) a separation-reducing agent. Examples of the separation-reducing agent to be used include thickeners such as nonionic cellulose ethers and compounds having, as partial structures, a hydrophobic substituent constituted by a C4-C30 hydrocarbon chain and a polyoxyalkylene chain with 2 to 300 mol (average number of moles) of a C2-C18 alkylene oxide being added. The compositional ratio by mass of the copolymer (A) as the component (1) (solid content) to the separation-reducing agent as the component (2) is preferably 10/90 to 99.99/0.01, and more preferably 50/50 to 99.9/0.1. A cement composition satisfying such combination is suitable as high-performance concrete, self-compacting concrete, and self-leveling material.

3) Combination of (1) the polycarboxylic acid copolymer (copolymer (A)) of the present invention and (2) a retarder. Examples of the retarder to be used include oxycarboxylic acids such as gluconic acid (and salts thereof) and citric acid (and salts thereof); saccharides such as glucose; sugar alcohols such as sorbitol; and phosphoric acids such as amino tri(methylene phosphoric acid). The compositional ratio by mass of the copolymer (A) as the component (1) (solid content) to the retarder as the component (2) is preferably 50/50 to 99.9/0.1, and more preferably 70/30 to 99/1.

4) Combination of (1) the polycarboxylic acid copolymer (copolymer (A)) of the present invention and (2) an accelerator. Examples of the accelerator to be used include soluble calcium salts such as calcium chloride, calcium nitrite, and calcium nitrate, chlorides such as iron chloride and magnesium chloride, thiosulfates, and formic acid and formic acid salts such as calcium formate. The compositional ratio by mass of the copolymer (A) (solid content) as the component (1) and the accelerator as the component (2) is preferably 10/90 to 99.9/0.1, and more preferably 20/80 to 99/1.

Advantageous Effects of Invention

Since the polycarboxylic acid copolymer of the present invention has the aforementioned structure, it is markedly excellent in various properties, particularly dispersibility, and is useful in various uses such as dispersants and admixtures for cement. In particular, the copolymer can give excellent fluidity to cement compositions such as cement paste, mortar, and concrete. Since the copolymer can give high fluidity to a super-high-strength cement composition containing silica fume cement, it is particularly useful in a main component of dispersants for cement or admixtures for cement. Thus, dispersants for cement, admixtures for cement, and cement compositions containing the polycarboxylic acid copolymer of the present invention make much contribution in, for example, the construction field where concrete is handled.

DESCRIPTION OF EMBODIMENTS

The present invention will be described in more detail below referring to, but not limited to, examples. Unless otherwise mentioned, the term "part(s)" means "part(s) by weight" and "%" means "% by mass".

In the following production examples and other parts, the weight average molecular weight of each copolymer was measured in the following conditions.

<Conditions for Measuring Weight Average Molecular Weight (Mw)>

The weight average molecular weight of each copolymer was measured by gel permeation chromatography (GPC) in terms of polyethylene glycol in the following measurement conditions.

(Measurement Conditions)

Device: Waters Alliance (2695) (Waters)

Analysis software: Empower professional+GPC option (Waters)

Column: TSK guard column SWXL+TSKgel G4000SWXL+G3000SWXL+G2000SWXL (TOSOH CORP.)

Detector: differential refractive index (RI) detector (Waters 2414, Waters)

Eluent: solution prepared by dissolving 115.6 g of sodium acetate trihydrate in a solvent mixture of 10999 g of water and 6001 g of acetonitrile, and adjusting the pH of the solution to 6.0 using acetic acid Standard for drawing calibration curve: polyethylene glycol (peak top molecular weight (Mp): 300000, 200000, 107000, 50000, 27700, 11840, 6450, and 1470)

Calibration curve: drawn using a cubic equation based on the Mp value and eluting time of the polyethylene glycol Flow rate: 1.0 mL/min Column temperature: 40° C.

Measurement time: 45 minutes

Amount of sample liquid: 100 μL (a solution for preparing an eluent, sample concentration: 0.5% by mass)

The weight average molecular weight of each copolymer was a molecular weight at a portion surrounded by A0, P1, and L1 in FIG. 1 excluding the remaining unsaturated polyalkylene glycol monomers.

PRODUCTION EXAMPLES of COPOLYMERS

Production Example 1

A glass reaction vessel equipped with a thermometer, a stirrer, a dropping funnel, a nitrogen inlet tube, and a reflux condenser was charged with 209.0 g of ion-exchanged water. The reaction device was nitrogen-purged under stirring, and the temperature was increased to 58° C. Next, an aqueous solution of 466.9 g of an unsaturated polyalkylene glycol ether (MBO-50) (which was formed by adding 50 mol on average of ethylene oxide (EO) to 3-methyl-3-buten-1-ol) dissolved in 116.7 g of ion-exchanged water and an aqueous solution of 63.1 g of acrylic acid diluted with 71.54 g of ion-exchanged water were dropwise added to the reaction vessel over five hours. Simultaneously, an aqueous solution of 0.74 g of L-ascorbic acid and 8.0 g of 3-mercaptopropionic acid dissolved in 25.7 g of ion-exchanged water and an aqueous solution of 3.8 g of ammonium persulfate dissolved in 34.5 g of ion-exchanged water were dropwise added to the reaction vessel over five hours. After the dropwise addition, the contents were stirred for one hour at 58° C., and then the polymerization reaction was completed. Thereafter, the reaction solution was neutralized to pH 7 using a 30% aqueous solution of sodium hydroxide at a temperature equal to or lower than the polymerization reaction temperature, thereby providing an aqueous solution of a polycarboxylic acid copolymer (1) having a weight average molecular weight (Mw) of 9300.

Production Examples 2 to 5

Aqueous solutions of polycarboxylic acid copolymers (2) to (5) shown in Table 1 were produced in the same manner as in Production Example 1.

Production Example 6

A glass reaction vessel equipped with a thermometer, a stirrer, a dropping funnel, a nitrogen inlet tube, and a reflux condenser was charged with 74.6 g of ion-exchanged water and 144.8 g of an unsaturated polyalkylene glycol ether (MBO-25) (which was formed by adding 25 mol on average of ethylene oxide (EO) to 3-methyl-3-buten-1-ol). The reaction device was nitrogen-purged under stirring and the temperature was increased to 60° C., and then 11.7 g of a 2.6% aqueous solution of hydrogen peroxide was added thereto. Next, an aqueous solution of 23.5 g of acrylic acid diluted with 5.8 g of ion-exchanged water was dropwise added to the reaction vessel over three hours. Simultaneously, an aqueous solution of 0.4 g of L-ascorbic acid and 2.6 g of 3-mercaptopropionic acid dissolved in 33.7 g of ion-exchanged water was dropwise added to the reaction vessel over three and a half hours. After the dropwise addition, the contents were stirred for one hour, and then the polymerization reaction was completed. Thereafter, the reaction solution was neutralized to pH 6.5 using a 30% aqueous solution of sodium hydroxide at a temperature equal to or lower than the polymerization reaction temperature, thereby providing an aqueous solution of a polycarboxylic acid copolymer (6) having a weight average molecular weight (Mw) of 9200.

Production Example 7

A glass reaction vessel equipped with a thermometer, a stirrer, a dropping funnel, a nitrogen inlet tube, and a reflux condenser was charged with 192.5 g of ion-exchanged water, 343.4 g of an unsaturated polyalkylene glycol ether (MBO-50) (which was formed by adding 50 mol on average of ethylene oxide (EO) to 3-methyl-3-buten-1-ol), 78.8 g of an unsaturated polyalkylene glycol ether (MBO-10) (which was formed by adding 10 mol on average of ethylene oxide (EO) to 3-methyl-3-buten-1-ol), and 27.0 g of acrylic acid. The reaction device was nitrogen-purged under stirring, and the temperature was increased to 58° C. Next, an aqueous solution of 80.9 g of acrylic acid diluted with 20.2 g of ion-exchanged water was dropwise added to the reaction vessel over three hours. Simultaneously, an aqueous solution of 1.23 g of L-ascorbic acid and 11.4 g of 3-mercaptopropionic acid dissolved in 80.7 g of ion-exchanged water and an aqueous solution of 6.6 g of ammonium persulfate dissolved in 157.4 g of ion-exchanged water were dropwise added to the reaction vessel over three and a half hours. After the dropwise addition, the contents were stirred for one hour, and then the polymerization reaction was completed. Thereafter, the reaction solution was neutralized to pH 7.0 using a 30% aqueous solution of sodium hydroxide at a temperature equal to or lower than the polymerization reaction temperature, thereby providing an aqueous solution of a polycarboxylic acid copolymer (7) having a weight average molecular weight (Mw) of 9800.

Production Example 8

A glass reaction vessel equipped with a thermometer, a stirrer, a dropping funnel, a nitrogen inlet tube, and a reflux condenser was charged with 270.2 g of ion-exchanged water. The reaction device was nitrogen-purged under stirring, and the temperature was increased to 58° C. Next, an aqueous solution of 424.0 g of an unsaturated polyalkylene glycol ether (MBO-50) (which was formed by adding 50 mol on average of ethylene oxide (EO) to 3-methyl-3-buten-1-ol) dissolved in 106 g of ion-exchanged water and an aqueous solution of 65.0 g of acrylic acid, 41.0 g of maleic acid (MA), and 71.54 g of ion-exchanged water mixed with each other were dropwise added to the reaction vessel over five hours. Simultaneously, an aqueous solution of 0.92 g of L-ascorbic acid and 10.0 g of 3-mercaptopropionic acid dissolved in 19.0 g of ion-exchanged water and an aqueous solution of 4.8 g of ammonium persulfate dissolved in 42.9 g of ion-exchanged water were dropwise added to the reaction vessel over five hours. After the dropwise addition, the contents were stirred for one hour at 58° C., and then the polymerization reaction was completed. Thereafter, the reaction solution was neutralized to pH 7 using a 30% aqueous solution of sodium hydroxide at a temperature equal to or lower than the polymerization reaction temperature, thereby providing an aqueous solution of a polycarboxylic acid copolymer (8) having a weight average molecular weight (Mw) of 10500.

Production Example 9

A glass reaction vessel equipped with a thermometer, a stirrer, a dropping funnel, a nitrogen inlet tube, and a reflux condenser was charged with 236.0 g of ion-exchanged water. The reaction device was nitrogen-purged under stirring, and the temperature was increased to 58° C. Next, an aqueous solution of 465.5 g of an unsaturated polyalkylene glycol ether (MBO-50) (which was formed by adding 50 mol on average of ethylene oxide (EO) to 3-methyl-3-buten-1-ol) dissolved in 116.4 g of ion-exchanged water and an aqueous solution of 46.3 g of acrylic acid, 18.1 g of butyl acrylate (BA), and 88.0 g of ion-exchanged water mixed with each other were dropwise added to the reaction vessel over five hours. Simultaneously, an aqueous solution of 0.68 g of L-ascorbic acid and 7.3 g of 3-mercaptopropionic acid dissolved in 24.4 g of ion-exchanged water and an aqueous solution of 3.5 g of ammonium persulfate dissolved in 23.4 g of ion-exchanged water were dropwise added to the reaction vessel over five hours. After the dropwise addition, the contents were stirred at 58° C. for one hour, and then the polymerization reaction was completed. Thereafter, the reaction solution was neutralized to pH 7 using a 30% aqueous solution of sodium hydroxide at a temperature equal to or lower than the polymerization reaction temperature, thereby providing an aqueous solution of a polycarboxylic acid copolymer (9) having a weight average molecular weight (Mw) of 11600.

Production Examples 10 and 11

Aqueous solutions of polycarboxylic acid copolymers (10) and (11) shown in Table 1 were produced in the same manner as in Production Example 1.

Production Example 12

A glass reaction vessel equipped with a thermometer, a stirrer, a dropping funnel, a nitrogen inlet tube, and a reflux condenser was charged with 100.0 g of ion-exchanged water. The reaction device was nitrogen-purged under stirring, and the temperature was increased to 58° C. Next, an aqueous solution of 167.8 g of an unsaturated polyalkylene glycol ether (MLA-150) (which was formed by adding 150 mol on average of ethylene oxide (EO) to 2-methylpropen-3-ol) dissolved in 42.0 g of ion-exchanged water and an aqueous solution of 32.2 g of acrylic acid and 93.7 g of ion-exchanged water mixed with each other were dropwise added to the reaction vessel over five hours. Simultaneously, an aqueous solution of 0.32 g of L-ascorbic acid and 2.5 g of 3-mercaptopropionic acid dissolved in 44.8 g of ion-exchanged water and an aqueous solution of 1.67 g of ammonium persulfate dissolved in 15.1 g of ion-exchanged water were dropwise added to the reaction vessel over five hours. After the dropwise addition, the contents were stirred at 58° C. for one hour, and then the polymerization reaction was completed. Thereafter, the reaction solution was neutralized to pH 7 using a 30% aqueous solution of sodium hydroxide at a temperature equal to or lower than the polymerization reaction temperature, thereby providing an aqueous solution of a polycarboxylic acid copolymer (12) having a weight average molecular weight (Mw) of 20000.

Production Example 13

A glass reaction vessel equipped with a thermometer, a stirrer, a dropping funnel, a nitrogen inlet tube, and a reflux condenser was charged with 390.1 g of an unsaturated polyalkylene glycol ether (MBO-50) (which was formed by adding 50 mol on average of ethylene oxide (EO) to 3-methyl-3-buten-1-ol), 49.9 g of maleic acid, and 266.3 g of ion-exchanged water. The reaction device was nitrogen-purged under stirring, and the temperature was increased to 80° C. Next, an aqueous solution of 0.96 g of 3-mercaptopropionic acid dissolved in 29.1 g of ion-exchanged water and an aqueous solution of 3.97 g of ammonium persulfate dissolved in 59.7 g of ion-exchanged water were dropwise added to the reaction vessel over five hours. After the dropwise addition, the contents were stirred at 80° C. for one hour, and then the polymerization reaction was completed. Thereafter, the reaction solution was neutralized to pH 7 using a 30% aqueous solution of sodium hydroxide at a temperature equal to or lower than the polymerization reaction temperature, thereby providing an aqueous solution of a polycarboxylic acid copolymer (13) having a weight average molecular weight (Mw) of 12500.

Production Example 14

A glass reaction vessel equipped with a thermometer, a stirrer, a dropping funnel, a nitrogen inlet tube, and a reflux condenser was charged with 75.0 g of ion-exchanged water. The reaction device was nitrogen-purged under stirring and heated to 58° C. An aqueous solution of 23.9 g of hydroxy polyethylene glycol (average number of moles of ethylene oxide added: 25) monomethacrylate (PGH-25E), 6.1 g of acrylic acid, and 15.5 g of ion-exchanged water mixed with each other was dropwise added to the reaction vessel over five hours. Simultaneously, an aqueous solution of 0.07 g of L-ascorbic acid and 0.77 g of 3-mercaptopropionic acid dissolved in 13.9 g of ion-exchanged water and an aqueous solution of 0.37 g of ammonium persulfate dissolved in 14.4 g of ion-exchanged water were dropwise added to the reaction vessel over five hours. After the dropwise addition, the contents were stirred at 58° C. for one hour, and then the polymerization reaction was completed. Thereafter, the reaction solution was neutralized to pH 6.5 using a 30% aqueous solution of sodium hydroxide at a temperature equal to or lower than the polymerization reaction temperature, thereby providing an aqueous solution of a polycarboxylic acid copolymer (14) having a weight average molecular weight (Mw) of 8100.

Production Example 15

A glass reaction vessel equipped with a thermometer, a stirrer, a dropping funnel, a nitrogen inlet tube, and a reflux condenser was charged with 159.0 g of ion-exchanged water. The reaction device was nitrogen-purged under stirring, and the solution temperature was controlled to 29° C. Next, an aqueous solution of 444.8 g of an unsaturated polyalkylene glycol ether (HBVE-50) (which was formed by adding 50 mol on average of ethylene oxide (EO) to 4-hydroxybutyl vinyl ether) dissolved in 211.2 g of ion-exchanged water and an aqueous solution of 85.2 g of acrylic acid and 43.10 g of ion-exchanged water mixed with each other were dropwise added to the reaction vessel over 1.5 hours. Simultaneously, an aqueous solution of 1.21 g of L-ascorbic acid and 10.2 g of 3-mercaptopropionic acid dissolved in 36.0 g of ion-exchanged water and 9.35 g of a 10% aqueous solution of hydrogen peroxide were dropwise added to the reaction vessel over 1.75 hours. After the dropwise addition, the contents were stirred for 0.5 hours, and then the polymerization reaction was completed. The solution temperature was controlled between 27° C. and 30° C. during the reaction. Thereafter, the reaction solution was neutralized to pH 7 using a 30% aqueous solution of sodium hydroxide, thereby providing an aqueous solution of a polycarboxylic acid copolymer (15) having a weight average molecular weight (Mw) of 9700.

Comparative Production Example 1

An aqueous solution of a comparative copolymer (1) shown in Table 1 was produced in the same manner as in Production Example 1 except that the amounts of the monomer components were changed and the ratio by mass of the monomers was changed as shown in Table 1.

Comparative Production Example 2

A glass reaction vessel equipped with a thermometer, a stirrer, a dropping funnel, a nitrogen inlet tube, and a reflux condenser was charged with 250.0 g of ion-exchanged water. The reaction device was nitrogen-purged under stirring and heated to 80° C. An aqueous solution of 315.2 g of methoxy polyethylene glycol (average number of moles of ethylene oxide added: 25) monomethacrylate (PGM-25E), 83.7 g of methacrylic acid, 8.5 g of 3-mercaptopropionic acid, and 261.2 g of ion-exchanged water mixed with each other was dropwise added to the reaction vessel over three hours, and an aqueous solution of 6.6 g of sodium persulfate dissolved in 88.2 g of ion-exchanged water was dropwise added to the reaction vessel over four hours. After the dropwise addition of the sodium persulfate aqueous solution, the contents were stirred for one hour, and then the polymerization reaction was completed. Thereafter, the reaction solution was neutralized to pH 6.5 using a 30% aqueous solution of sodium hydroxide at a temperature equal to or lower than the polymerization reaction temperature, thereby providing an aqueous solution of a polycarboxylic acid comparative copolymer (2) having a weight average molecular weight (Mw) of 10800.

Comparative Production Example 3

An aqueous solution of a comparative copolymer (3) shown in Table 1 was produced in the same manner as in Comparative Production Example 2 except that PGM-25E was replaced with methoxy polyethylene glycol (average number of moles of ethylene oxide added: 50) monomethacrylate (PGM-50E).

Comparative Production Example 4

A glass reaction vessel equipped with a thermometer, a stirrer, a dropping funnel, a nitrogen inlet tube, and a reflux condenser was charged with 180.0 g of ion-exchanged water. The reaction device was nitrogen-purged under stirring and heated to 58° C. An aqueous solution of 47.8 g of methoxy polyethylene glycol (average number of moles of ethylene oxide added: 25) monomethacrylate (PGM-25E), 12.2 g of acrylic acid, and 31.0 g of ion-exchanged water mixed with each other was dropwise added to the reaction vessel over five hours. Simultaneously, an aqueous solution of 0.15 g of L-ascorbic acid and 2.25 g of 3-mercaptopropionic acid dissolved in 11.5 g of ion-exchanged water and an aqueous solution of 0.75 g of ammonium persulfate dissolved in 14.3 g of ion-exchanged water were dropwise added to the reaction vessel over five hours. After the dropwise addition, the contents were stirred at 58° C. for one hour, and then the polymerization reaction was completed. Thereafter, the reaction solution was neutralized to pH 6.5 using a 30% aqueous solution of sodium hydroxide at a temperature equal to or lower than the polymerization reaction temperature, thereby providing an aqueous solution of a polycarboxylic acid comparative copolymer (4) having a weight average molecular weight (Mw) of 7700.

Comparative Production Example 5

An aqueous solution of a comparative copolymer (5) shown in Table 1 was produced in the same manner as in Production Example 12.

Table 1 shows the compositional ratio, weight average molecular weight, and area percentage (S1/S×100 (%)) of the dimer including two units of the unsaturated polyalkylene glycol monomer (a) of the respective copolymers produced in the production examples.

In calculation of the monomer compositional ratio, the amount of acrylic acid was on the basis of sodium acrylate equivalent and the amount of maleic acid was on the basis of disodium maleate equivalent.

In Table 1, n represents the average number of moles of oxyalkylene groups added in a monomer having a polyalkylene glycol chain (for example, the monomer (a)), where the oxyalkylene groups constitute the polyalkylene glycol chain.

TABLE 1

|  | Copolymer | Structure | n | Compositional ratio (by mass) | Weight average molecular weight (Mw) | Area percentage of dimer S1/S × 100 (%) |
|---|---|---|---|---|---|---|
| Production Example 1 | Copolymer (1) | MBO-50/SAA | 50 | 85/15 | 9300 | 18.9 |
| Production Example 2 | Copolymer (2) | MBO-50/SAA | 50 | 80/20 | 9200 | 20.3 |
| Production Example 3 | Copolymer (3) | MBO-50/SAA | 50 | 80/20 | 13800 | 13.1 |
| Production Example 4 | Copolymer (4) | MBO-50/SAA | 50 | 75/25 | 8100 | 23.8 |
| Production Example 5 | Copolymer (5) | MBO-50/SAA | 50 | 75/25 | 14100 | 13.1 |
| Production Example 6 | Copolymer (6) | MBO-25/SAA | 25 | 82.5/17.5 | 9200 | 9.3 |
| Production Example 7 | Copolymer (7) | MBO-10/MBO-50/SAA | 30 | 61/14/25 | 9800 | 10.1 |
| Production Example 8 | Copolymer (8) | MBO-50/SMA/SAA | 50 | 75/10/15 | 10500 | 17.8 |
| Production Example 9 | Copolymer (9) | MBO-50/BA/SAA | 50 | 77/3/20 | 11600 | 12.5 |
| Production Example 10 | Copolymer (10) | MBO-50/SAA | 50 | 85/15 | 21300 | 7.3 |
| Production Example 11 | Copolymer (11) | MBO-50/SAA | 50 | 85/15 | 16200 | 10.0 |
| Production Example 12 | Copolymer (12) | MLA-150/SM | 150 | 80/20 | 20000 | 26.2 |
| Production Example 13 | Copolymer (13) | MBO-50/SMA | 50 | 85/15 | 12500 | 12.6 |
| Production Example 14 | Copolymer (14) | PGH-25E/SAA | 25 | 75/25 | 8100 | 21.8 |
| Production Example 15 | Copolymer (15) | HBVE-50/SAA | 50 | 80/20 | 9700 | 12.8 |
| Comparative Production Example 1 | Comparative copolymer (1) | MBO-50/SAA | 50 | 88/12 | 38000 | 6.0 |
| Comparative Production Example 2 | Comparative copolymer (2) | PGM-25E/SMAA | 25 | 75/25 | 10800 | 10.8 |
| Comparative Production Example 3 | Comparative copolymer (3) | PGM-50E/SMAA | 50 | 75/25 | 9500 | 6.1 |
| Comparative Production Example 4 | Comparative copolymer (4) | PGM-25E/SAA | 25 | 75/25 | 7700 | 11.2 |
| Comparative Production Example 5 | Comparative copolymer (5) | MLA-150/SAA | 150 | 80/20 | 30000 | 18.7 |

SAA: sodium acrylate,
SMA: sodium maleate,
BA: butyl acrylate

Examples 1 to 15 and Comparative Examples 1 to 5

With the copolymers produced in Production Examples 1 to 15 and Comparative Production Examples 1 to 5, cement pastes were produced in the manner mentioned below, and the paste flow value, the air content, and the paste temperature of the respective pastes were determined. The results are shown in Table 2.

<Materials and Agents Used>
Silica fume cement from UBE-MITSUBISHI CEMENT CORP.: 600 g
Water: 84 g
Copolymer: 0.6% by mass/mass of cement (shown in Table 2)
MICRO-AIR 404 (oxyalkylene defoamer) from Pozzolith Bussan Co. Ltd.: 0.03% by mass/mass of cement <Preparation of Cement Paste>
A mortar mixer (HOBART) was charged with 600 g of silica fume cement, 84 g of water, and the copolymer, and the components were mixed for two minutes at a low speed. The stirring was stopped, and the paste on the container wall was scraped off over 30 seconds. Then, the contents were mixed for three minutes at a high rotation speed, thereby providing paste.

<Determination of Flow Value>
The paste prepared was filled into a hollow cylindrical container (55 mm in diameter, 50 mm in height) on a horizontal table. This hollow cylindrical container was lifted vertically to cause the paste to spread on the table. The diameters of the spread paste were measured in longitudinal and lateral directions, and the average value thereof was defined as a paste flow value.

<Determination of Air Content>
The mass of 100 ml of the paste prepared was measured. The amount of entrained air was then calculated on the basis of the specific gravities of the materials used.

TABLE 2

|  | Copolymer | Amount of copolymer (wt %/C.) | Paste flow value (mm) | Air content (%) | Paste temperature (° C.) |
|---|---|---|---|---|---|
| Example 1 | Copolymer (1) | 0.6 | 249 | 2.1 | 23.3 |
| Example 2 | Copolymer (2) | 0.6 | 255 | 2.3 | 22.8 |
| Example 3 | Copolymer (3) | 0.6 | 235 | 2.1 | 23.1 |
| Example 4 | Copolymer (4) | 0.6 | 254 | 2.5 | 22.7 |
| Example 5 | Copolymer (5) | 0.6 | 236 | 1.6 | 23.3 |
| Example 6 | Copolymer (6) | 0.6 | 240 | 2.7 | 22.9 |
| Example 7 | Copolymer (7) | 0.6 | 250 | 2.6 | 23.3 |
| Example 8 | Copolymer (8) | 0.6 | 260 | 2.4 | 23.4 |
| Example 9 | Copolymer (9) | 0.6 | 255 | 3.5 | 22.0 |
| Example 10 | Copolymer (10) | 0.6 | 225 | 1.7 | 22.9 |
| Example 11 | Copolymer (11) | 0.6 | 228 | 0.9 | 22.9 |
| Example 12 | Copolymer (12) | 0.6 | 223 | 2.7 | 23.0 |
| Example 13 | Copolymer (13) | 0.6 | 229 | 3.1 | 24.9 |
| Example 14 | Copolymer (14) | 0.6 | 224 | 3.4 | 21.9 |
| Example 15 | Copolymer (15) | 0.6 | 233 | 2.8 | 22.0 |
| Comparative Example 1 | Comparative copolymer (1) | 0.6 | 162 | 4.5 | 22.6 |
| Comparative Example 2 | Comparative copolymer (2) | 0.6 | 196 | 5.1 | 23.3 |
| Comparative Example 3 | Comparative copolymer (3) | 0.6 | 217 | 3.9 | 23.4 |
| Comparative Example 4 | Comparative copolymer (4) | 0.6 | 158 | 4.3 | 22.8 |
| Comparative Example 5 | Comparative copolymer (5) | 0.6 | 177 | 2.2 | 22.2 |

Table 1 shows that each of the copolymers (1) to (15) at least included a structural unit derived from the unsaturated polyalkylene glycol monomer (a) and a structural unit derived from the unsaturated carboxylic acid monomer (b), and had a weight average molecular weight of 5000 to 25000 and an area percentage of the dimer of 7% or higher. With respect to the copolymers (1) to (9), in particular, the structural unit derived from the monomer (a) therein is a structural unit having an ether structure and the weight average molecular weights thereof were each 5000 to 15000. In contrast, the weight average molecular weights of the comparative copolymers (1) and (5) each exceeded 25000 although these copolymers included similar structural unit. Further, the area percentage of the dimer in the comparative copolymer (1) was lower than 7%. The comparative copolymers (2) to (4) included a structural unit in which the terminal hydroxy group in the formula (1) was a methoxy group instead of the structural unit derived from the unsaturated polyalkylene glycol monomer (a), and the area percentage of the dimer of the comparative copolymer (3) was lower than 7%.

In consideration of the above differences, the inventors compared the results of evaluating the flow values of cement paste satisfying the water/silica fume cement (ratio by mass)= 0.14. Table 2 shows the following: in Examples 1 to 15 using the copolymers (1) to (15), respectively, the paste flow value was 223 mm or higher, and especially in Examples 1 to 9 using the copolymers (1) to (9), respectively, the flow value was as high as 235 mm or higher; in Comparative Examples 1 to 5 using the comparative copolymers (1) to (5), respectively, the flow value was as low as 217 mm or lower.

These results prove that the copolymer including a structural unit derived from the unsaturated polyalkylene glycol monomer (a) and a structural unit derived from the unsaturated carboxylic acid monomer (b), having a weight average molecular weight (Mw) of 5000 to 25000, and having an area percentage of the dimer including two units of the unsaturated polyalkylene glycol monomer (a) of 7% or higher can exert excellent fluidity. The results also prove that the fluidity can be further improved when the structural unit derived from the monomer (a) have an ether structure and/or the weight average molecular weight is 5000 to 15000.

The invention claimed is:
1. A polycarboxylic acid copolymer comprising:
a structural unit (I) derived from an unsaturated polyalkylene glycol monomer (a) represented by the following formula (1):

[Chem. 1]

(1)

wherein $R^1$ and $R^2$ are the same as or different from each other and each represent a hydrogen atom or a methyl group; p is an integer of 0 to 2; q is 0 or 1; AOs are the same as or different from each other and each represent a C2-C18 oxyalkylene group; and n is an average number of moles of the oxyalkylene groups represented by AOs added, and is 20 to 300; and
a structural unit (II) derived from an unsaturated carboxylic acid monomer (b),
the copolymer having a weight average molecular weight (Mw) of 5000 to 15000,
the copolymer including a dimer including two units of the unsaturated polyalkylene glycol monomer (a) bonded to each other and having an area percentage of the dimer of 7% or greater, where the area percentage is defined through the following steps (1) to (8):
(1) determining the weight average molecular weight of the copolymer by gel permeation chromatography (GPC);
(2) drawing a base line between A0 and B0, where A0 represents the starting point of the resulting GPC chart of the copolymer and B0 represents the end point of a region where the remaining unsaturated polyalkylene glycol monomer (a) is detected;
(3) letting P1 be the first minimal point from the low molecular weight side on the GPC chart of the copolymer;
(4) drawing a line vertically from P1 to L1, where L1 represents the intersection point between the vertical line and the base line;
(5) similarly, letting P2 be the second minimal point from the low molecular weight side in the GPC chart, and drawing a line vertically from P2 to L2, where L2 represents the intersection point between the vertical line and the base line;
(6) letting S1 be the area surrounded by P1, P2, L1, and L2;
(7) letting S be the whole area surrounded by the resulting GPC chart and the base line; and
(8) defining the percentage of the area S1 to the area S (S1/S×100) as the area percentage (%) of the dimer including two units of the unsaturated polyalkylene glycol monomer (a) bonded to each other.

2. The polycarboxylic acid copolymer according to claim 1,
wherein the unsaturated polyalkylene glycol monomer (a) is represented by the following formula (2):

wherein Y represents a C2-C6 alkenyl group; AOs may be the same as or different from each other and each represent a C2-C18 oxyalkylene group; and n is an average number of moles of the oxyalkylene groups represented by AOs added, and is 20 to 300.

3. The polycarboxylic acid copolymer according to claim 1,
wherein the n is 20 to 100.

4. The polycarboxylic acid copolymer according to claim 1,
wherein the structural unit (I) derived from the unsaturated polyalkylene glycol monomer (a) and the structural unit (II) derived from the unsaturated carboxylic acid monomer (b) satisfy a constitutional ratio ((I)/(II)) by mass of (70 to 90)/(10 to 30).

5. The polycarboxylic acid copolymer according to claim 1,
wherein the unsaturated carboxylic acid monomer (b) includes an unsaturated monocarboxylic acid monomer (b-1) and an unsaturated dicarboxylic acid monomer (b-2), and
the structural unit (I) derived from the unsaturated polyalkylene glycol monomer (a), a structural unit (II-1) derived from the unsaturated monocarboxylic acid monomer (b-1), and a structural unit (II-2) derived from the unsaturated dicarboxylic acid monomer (b-2) satisfy a constitutional ratio ((I)/(II-1)/(II-2)) by mass of (55 to 85)/(10 to 30)/(5 to 15).

6. The polycarboxylic acid copolymer according to claim 1, further comprising
A structural unit (III) derived from an unsaturated monocarboxylic acid ester monomer (c),
wherein the structural unit (I) derived from the unsaturated polyalkylene glycol monomer (a), the structural unit (II) derived from the unsaturated carboxylic acid monomer (b), and the structural unit (III) derived from the unsaturated monocarboxylic acid ester monomer (c) satisfy a constitutional ratio ((I)/(II)/(III)) by mass of (65 to 84)/(10 to 30)/(1 to 5).

7. The polycarboxylic acid copolymer according to claim 1,
which is to be used in a dispersant for cement.

8. A dispersant for cement, comprising
the polycarboxylic acid copolymer according to claim 1.

9. An admixture for cement, comprising
the polycarboxylic acid copolymer according to claim 1.

10. A cement composition comprising
the polycarboxylic acid copolymer according to claim 1, silica fume cement, and water.

* * * * *